Figure 3:
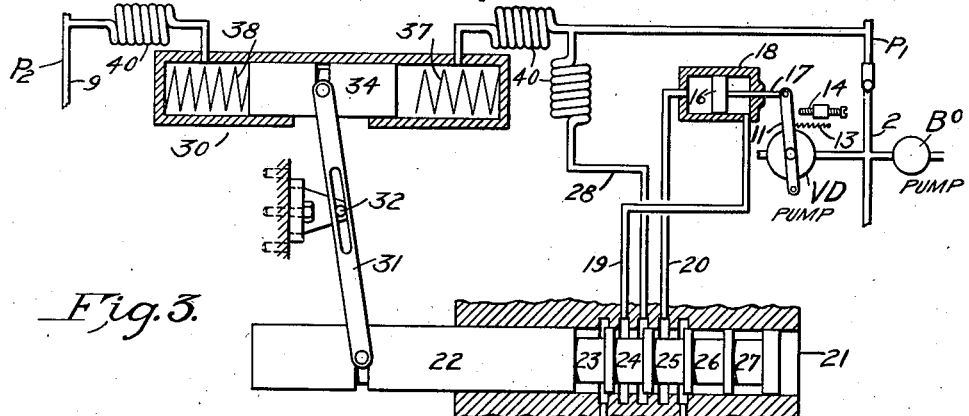

April 2, 1935.  H. ERNST  1,996,466
PRESSURE RESPONSIVE HYDRAULIC FEED CONTROL MECHANISM
Filed Sept. 23, 1930  2 Sheets-Sheet 1
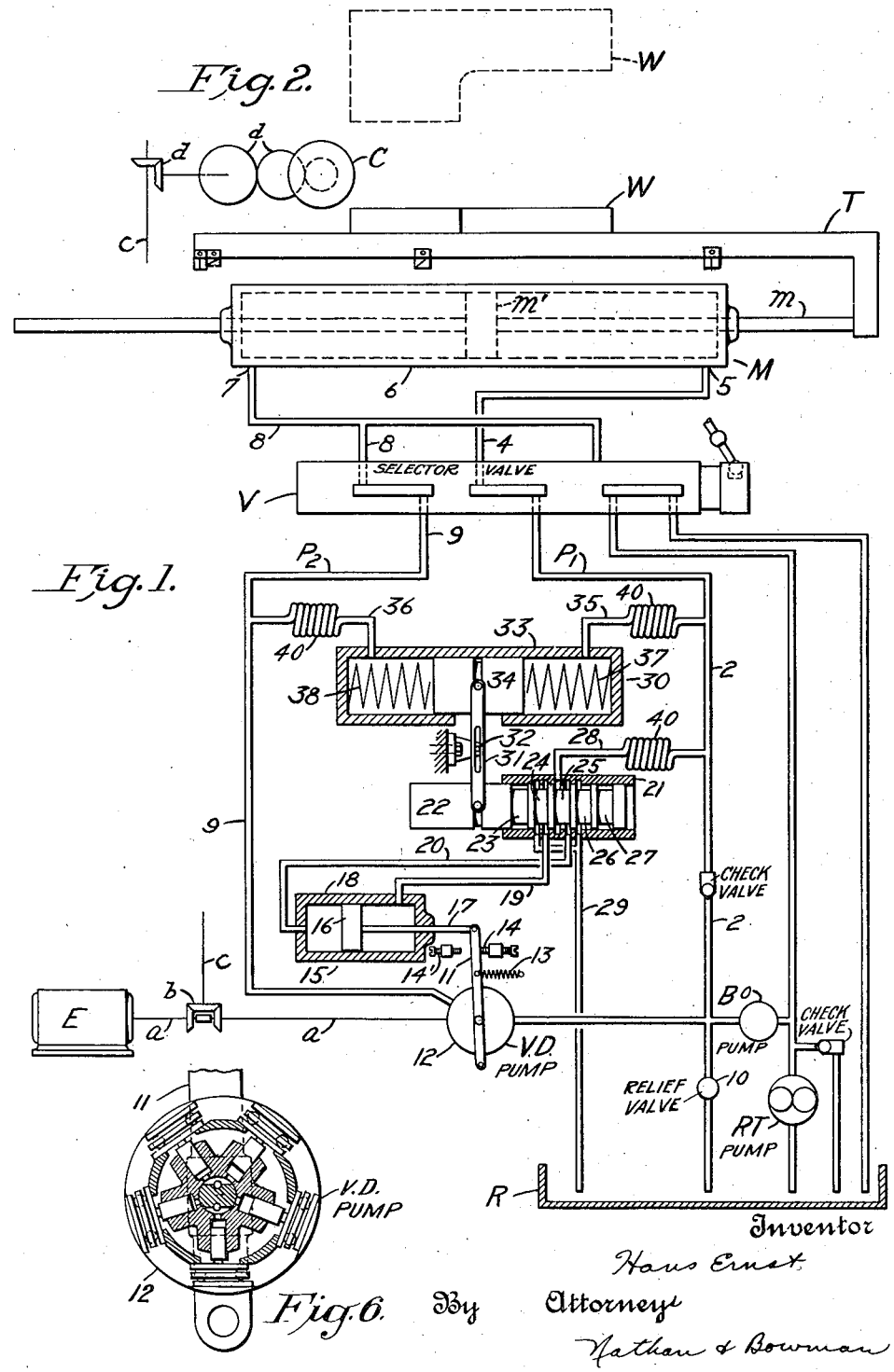
Inventor
Hans Ernst
By Attorneys
Nathan & Bowman April 2, 1935.　　　　H. ERNST　　　　1,996,466
PRESSURE RESPONSIVE HYDRAULIC FEED CONTROL MECHANISM
Filed Sept. 23, 1930　　2 Sheets-Sheet 2

Inventor
Hans Ernst
By Attorneys
Nathan & Bowman

UNITED STATES PATENT OFFICE 1,996,466

PRESSURE RESPONSIVE HYDRAULIC FEED CONTROL MECHANISM

Hans Ernst, Cincinnati, Ohio, assignor to The Cincinnati Milling Machine Company, Cincinnati, Ohio, a corporation of Ohio Application September 23, 1930, Serial No. 483,862

12 Claims. (Cl. 60—52)

This invention relates to feed controls for machine tools and particularly to those types of machine tools in which the feeding movement is accomplished through the medium of a fluid under pressure.

It has for its general object to provide a control device for regulating or controlling the rate of feed or translatory movement of the movable member which will be automatic in operation and immediately responsive to the resistance to movement encountered by the movable member either by the difficulties of stock removal or other cause whatsoever, to the end that a machine tool or other instrumentality incorporating this invention may function at maximum efficiency, within predetermined limits, throughout a tooling operation without the necessity of manual control or attention thereto by the operator.

A further object of this invention is to provide an automatically actuated rate controlling device with means for controlling the maximum rate of feed to be utilized during the tooling operation to prevent an exertion of a feeding force or impulsion beyond the resisting capacity of the machine, work-piece, structure, or holding means therefor, which stresses might otherwise result in injury to said parts.

Still a further object of this invention is the provision in a rate control mechanism of means for automatically restraining the initial feeding movement of the work or tool carrier to a predetermined low rate prior to the beginning of the cut whereby the tool and work may be brought into engagement without excessive jarring of the parts, and subsequently, automatically increasing the rate of relative movement between the parts to a higher rate during the continuance of the tooling operation.

It is desirable in machine tools of the character to which this invention is applicable, that the feed control device be adjustable so as to limit the maximum value of the resistance encountered by the driving mechanism in effecting the machining of a particular class of work and as a further concept of this invention it is proposed to provide a means for automatically regulating the feed driving mechanism in accordance with said resistance in a manner whereby the lighter cuts may be taken at the maximum rate and heavier cuts at a reduced rate and thus tend to stabilize the stock removing capacity of the machine per unit of time.

The ordinary hydraulic machine comprises an hydraulic motor, usually in the form of a piston and cylinder, one of the elements of which is connected to the shiftable member of the machine, either the tool carrier or work carrier, while the other element of the motor is usually held relatively stationary. Fluid under pressure is conveyed to and from the cylinder and causes a relative movement between it and the piston thereby to effect relative movement between the tool and work carrier associated therewith. When the work is engaged by the tool the resistance to relative movement increases and immediately there is an increase in the pressure difference between the forward and return lines to the cylinder, and, as the tooling operation progresses there may be a further change in work resistance according to the character of the work-piece. For example, if the work-piece varies in degree of hardness, shape, size or contour, etc., there are produced changes in work resistance during the continuance of the operation which, in hydraulically actuated tools, produce corresponding changes in the relative pressures in the forward and return lines of the system.

This invention proposes to utilize the effects of variations in work resistance upon the fluid pressures to operate a control device which in turn regulates the rate of feed, within the desired limits, at which the translatable unit of the machine will be most efficiently driven.

Although this invention is applicable to many types of hydraulically actuated machines, it may be understood best with reference to a conventional milling machine such as described in part herein. In machines of this character, it is common to impart rapid traverse and feeding movements to the table by means of fluid pressure supplied to an hydraulic motor connected to the table and usually the fluid pressure is supplied by suitable pumps located in the machine base. In this conventional system, the intake and discharge parts of the pumps are adapted to be connected to the intake and exhaust ports of the motor, and interposed therebetween is the usual control valve for selectively determining the coupling of the feed or traverse pumps and for reversing the connections to selectively reverse the direction of travel of the table.

Variations in the rate of feed have heretofore been accomplished by adjustable trip dogs or cams carried by the table and which in turn, control the supply of fluid to or from the motor. It will be seen that these prior forms of control mechanisms do not and cannot provide for variably adjusting the feed mechanism to effect a rate of feed commensurate with variations in work resistance during the tooling operation.

This invention proposes to overcome the disadvantages of prior machines by providing a pressure actuated rate controlling device automatically responsive to variations in resistance to movement of a translatable member for controlling the rate of movement thereof and comprises essentially, a feed adjusting motor, the piston of which is operatively connected to the control element determining the volumetric flow of fluid through the rate controlling unit, and which receives actuating fluid from one of the pressure lines of the system. A pressure responsive device is connected to the pressure lines of the circuit which reacts to variations in pressure differentials existing between portions of the system to regulate or control the shifting or positioning of a valve which controls the fluid supply to and from the feed adjusting cylinder.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 4:
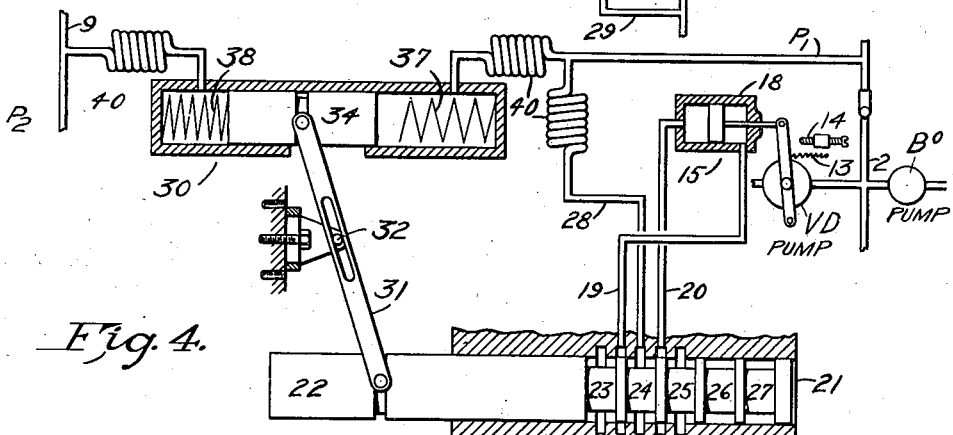
Figure 5:
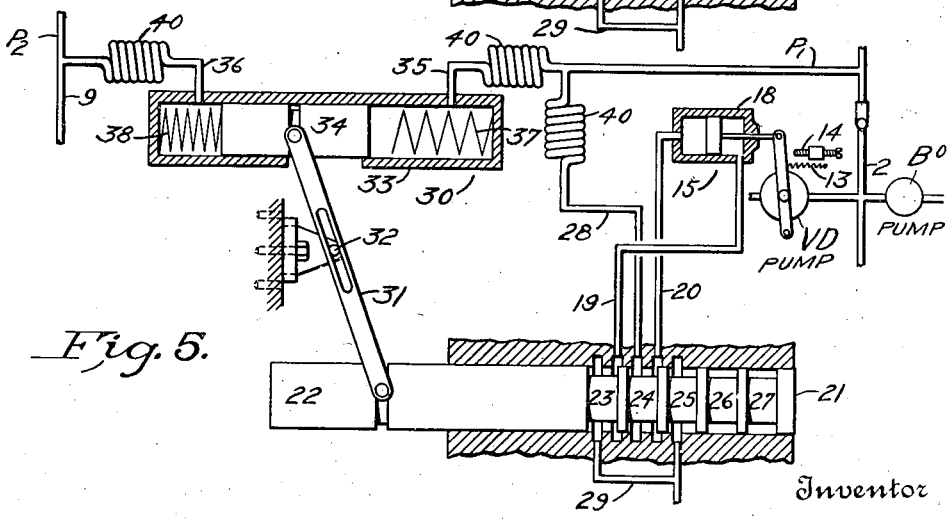

Figure 1 is a diagrammatic representation of a conventional hydraulic system incorporating this invention, illustrating the positioning of the parts during an idle feeding movement and omitting therefrom, in the interests of clarity, the purely structural details of a conventional machine. Fig. 2 is a plan view of a representative work-piece. Fig. 3 is a view similar to Fig. 1 but illustrating the parts in a position giving an increasing feed rate. Fig. 4 is a view illustrating the parts in a position to give a constant rate of feed when the resultant working stresses for that rate, reach the desired maximum for which the apparatus has been set. Fig. 5 is a view illustrating the parts in a position to decrease the feed rate when the predetermined power requirement has been exceeded. Fig. 6 is a sectional view of a standard form of variable delivery pump, illustrating the arrangement of the parts in a normal running position.

Referring more particularly to the arrangement shown in Fig. 1 this invention is incorporated in a machine having a work table T adapted to carry thereon a suitable work-piece W that is to be engaged by a tool C in the usual manner. Movement is imparted to the table by means of an hydraulic motor M, the piston rod $m$ providing the connection between table and motor.

Fluid under pressure may be supplied to the motor M from any suitable source, but in the system illustrated there is a rapid traverse circuit including a pump RT and a feed circuit including a variable delivery metering unit VD supplemented by the outflow from a low volume high pressure pump $B_o$.

The discharge from the VD unit combines in line 2 with the discharge from the $B_o$ pump and passes to a direction control valve V. Fig. 1 illustrates the valve V shifted to a position to direct the fluid in the forward pressure line 2 to line 4 and thence to the right end of the cylinder 6 of the motor M through port 5. Fluid thus directed moves the piston $m'$ of the motor toward the left and the back pressure fluid in the left end of the motor escapes through the port 7, line 8, valve V and line 9 back to the VD unit. It will be noted that in the particular system illustrated the rate of advance of the table is determined by the rate at which the fluid is permitted to be exhausted from the cylinder 6, and if the VD unit is set to permit a large volume of oil to pass therethrough, the feed rate will be rapid, whereas if the VD unit be adjusted to permit a smaller volume of fluid to pass the feed rate will be correspondingly slower. A relief valve 10 in the forward pressure line 2 insures that the forward pressure does not exceed a predetermined maximum, however caused. This invention is, however, equally applicable, to numerous other circuits such as, for example, a system in which the rate is controlled by regulating the supply of fluid to the motor and it is to be understood that the circuit described herein is merely a preferred form and used for the purpose of illustration only.

A prime mover E through a main drive shaft $a$, drives the VD unit, as well as, but not necessarily so, the $B_o$ pump and/or the RT pump. Rotation of the cutter or tool C is effected in the usual manner as by means of a train of gears $d$ which is driven by the splined shaft $c$. While the drawings illustrated shaft $c$ being driven from the shaft $a$ through the reversing gears $b$, the cutter drive train may, if desired, be driven quite independently of the table feed or traverse drive.

The foregoing briefly describes the operation of a conventional hydraulic system. However, if a more detailed description of these features is desired reference may be had to British Patent #297,104.

Under normal conditions of operation the tooling cycle of such a machine is as follows: The operator secures a blank work-piece to the table and starts the machine, the approach of work and tool being at a rapid traverse rate, utilizing the RT pump circuit. To prevent the tool engaging the work at a rapid rate, trip dogs mounted on the table shift the selector valve V so as to short circuit the rapid traverse pump RT to the reservoir and to connect the VD unit and $B_o$ pump to the motor. The VD unit has been previously adjusted to a low feed limit and the table continues its forward movement but at a slow rate. This adjustment may assume various forms according to the style of variable unit employed. The type shown herein however is the ordinary variable delivery pump type in which the volume of flow therethrough is controlled by the positioning of the pintle 11 which carries the radially disposed pump cylinders. Since the cylinder casing is mounted so as to be moved eccentrically to the piston driving element 12, the greatest flow through the unit takes place when the eccentricity is greatest and there is no flow when the elements are in coaxial alignment.

A suitable spring 13 or other device normally urges the pump pintle 11 against a low feed limit stop 14 which may be adjusted so as to permit a feed suitable for tool and work engagement or to limit the feed to the minimum rate to be utilized during the tooling operation. The table feeds forward at an approach feed rate until the cutter engages the work after which the feed rate is automatically accelerated until the prescribed maximum resistance to work advance is built up by the tooling forces and the feed then automatically remains substantially constant as will later become apparent.

The rate control unit VD, which may be a throttle or variable displacement pump, is adapted to be adjusted by means of an auxiliary motor 15, the piston 16 thereof, being attached to the pintle 11 by the connection 17. Automatic means are provided for adjusting the unit VD and thus controlling the actuation of the motor M, in accordance with variations in work resistance which comprises a sensitivity device, responsive to variations in the potentials of the propelling fluid, and a controller unit now to be explained.

Pressure fluid, preferably from the forward pressure line, is passed through and under control of a controller 21 to the feed adjusting cylinder 18. The valve plunger 22 of the controller is preferably formed with a series of reduced portions 23, 24, 25, 26 and 27 which are adapted to connect the supply line 28 with one end of the feed adjusting cylinder 18 and the other end of the cylinder to the exhaust line 29, and conversely. The positioning of the valve plunger 22 is, however, under the control of the pressure responsive device 30, a lever 31, fulcrumed at 32 providing the connecting medium.

This device comprises a cylinder 33, within which is slidably mounted a piston 34 connected with the lever 31, and which has its opposite ends connected through conduits 35 and 36 to the forward and back pressure lines 2 and 9 respectively. Equalizing springs 37 and 38 normally tend to maintain the piston 34 in its mid-way position, permitting, however, a slight side play for initial movement of the valve plunger 22.

Under normal idling conditions the pressures $P_1$ and $P_2$ in the lines 2 and 9 respectively are approximately equal and therefore the forces acting upon the plunger 34 are equalized and the plunger assumes a position such as to move the valve 22 to connect pressure line 28, chamber 25, line 20, with the left end of the feed adjusting cylinder 18. Pressure fluid thus directed moves the pintle of the VD unit against the adjustable stop 14, which causes the table to advance at the approach rate, previously mentioned, until the cutter engages the work-piece.

If the cutter is rotating so as to take an upward cut, against the feed, (work resistance positive) the pressures $P_1$ and $P_2$ are no longer equal and $P_1$ exceeds $P_2$ by an amount which varies directly with the cutting force or work resistance.

The increase in $P_1$ over $P_2$ acting upon the piston 34, moves the latter toward the left against the spring 38, which movement shifts valve 22 to the position indicated by Fig. 3. Fluid under pressure now passes from line 28, through chamber 24 and line 19 to the right end of the feed regulating cylinder 18 and shifts the piston 16, rod 17, pintle 11 toward the left and increases the flow from the VD unit. Fluid in the opposite end of the cylinder is discharged through line 20, channel 25, and line 29 to the reservoir. The automatic adjustment of the VD unit in this manner accelerates the feed rate until the increase in feeding force or work resistance increases the pressure difference between $P_1$ and $P_2$ and effects a further movement of the double acting piston 34 toward the left, see Fig. 4. The valve plunger 22 has now taken up a new position and isolates the feed adjusting cylinder conduits 19 and 20 from the pressure supply line 28 and drain line 29 thus trapping or locking the fluid within the feed cylinder 18.

The locked condition of the feed adjusting motor 15, maintains the VD unit in its adjusted position and the feed continues constant at a rate determinative by the predetermined pressure difference in the respective branches of the system.

The duration of table feed at this rate which may or may not be the maximum limit as determined by adjustment of the high feed limit stop 14', will depend upon the character of the work, and if the resistance to feeding becomes greater, as when encountering harder portions or larger areas of the workpiece, the pressure difference between the two branches of the circuit increases and moves the piston 34 further toward the left against the spring 38. This further movement causes the valve plunger 22 to assume a new position (Fig. 5) such that fluid pressure passes from line 28 to line 20 to the left end of the feed adjusting cylinder 18 and opens line 19 thereof to the drain. The feed adjusting motor now acts in a manner immediately to decrease the feed rate when the predetermined pressure difference has been exceeded. The feed rate decelerates until the pressure difference reaches a value such that the pressure responsive device 30 returns the valve plunger 22 to its neutral position suspending further deceleration of the feed rate.

The converse is true if the work resistance decreases for any reason such as, for example, when the tool reaches softer material or smaller areas for a given depth of cut. In this case the pressure difference $P_1$—$P_2$ decreases, piston 34 of the control cylinder 33, under the action of back pressure fluid and spring 38, moves toward the right, see Fig. 3, and moves the valve plunger 22 to a position which effects an increase in the feed rate.

The feed is thereby automatically accelerated until the desired limit of feeding pressure urge is again reached. When this occurs the valve plunger 22 has moved to a position suspending further action of the feed adjusting unit 15. However, to prevent an excessive feed rate in the event that the work resistance encountered does not reach a preselected maximum for normal tooling, an adjustable high feed limit stop 14' intercepts the movement of the throttling unit VD and restrains further acceleration in feed rate.

The valve plunger 22 flutters back and forth in this manner and maintains the feed rate at the maximum value permitted by the character of the work and/or capacity of the tool, until the tool clears the work-piece. The pressure difference $P_1$—$P_2$, after completion of the cut, now drops to a substantially zero quantity, thereby permitting springs 37 and 38 to return the control piston 34 to its neutral position. Valve plunger 22 once more moves to a position permitting pressure fluid from line 28 to enter the feed regulating motor to effect a reduction in the feed rate to the low limit and thus reversals may be accomplished when the momentum of the parts is relatively low or to permit the tool, as in gap-milling operations, for example, to engage the next surface at an approach feed rate.

So that the pressure responsive device 30 and feed regulating motor 15 may operate smoothly and evenly and to prevent undesirably rapid movements of the members, choking devices 40 are placed in the pressure lines 28, 35 and 36 and which also serve to dampen out any fluid pulsations or vibrations which may exist in the system.

For machining certain classes of work a certain maximum value for work resistance is most desirable, while for other classes of more rigid or securely mounted work a higher feeding pressure differential may be utilized, and to the end that a machine tool incorporating this invention be made flexible enough to cover a wide range and variety of work, this invention provides an adjustable means for controlling the value of maximum effective translation pressure available for each particular class or kind of work which is desired to be machined.

Since the pressure difference $P_1—P_2$ varies with changes in work resistance the piston 34 is urged against the spring 38 a unit distance (when the work resistance is positive) for a unit increase in pressure difference, and if the valve plunger 22 be connected directly to the piston 34 a unit movement of the piston moves the valve a corresponding amount. However, such an arrangement of parts, although suitable for a given class of work or a single purpose machine, is entirely unsuitable for machines which, of necessity, must be capable of handling a large variety of work. Therefore, in order to render the feed control device adaptable for a variety of work it is important that adjustable means be provided for varying the effect of various preselected pressure differentials between $P_1$ and $P_2$, upon the movement of the valve plunger thereby to vary the maximum feasible pressure of force acting against a given work-piece.

To accomplish this end the fulcrum 32 of the valve lever 31 is adjustably mounted whereby the lengths of the lever arms upon opposite sides thereof may be varied. The ratio of valve movement to piston movement may be thus adjusted and the feed decelerated when the tooling force exceeds the preselected maximum.

The permissible limit of resistance to translation offered and thus the maximum pressure differential must be determined beforehand and it is governed, for example, by the rigidity of the work-piece or fixture and the finish desired. Having determined the proper maximum, the operator adjusts the fulcrum 32 of the lever 31 to a position such that when the work resistance reaches the preselected maximum the pressure difference $P_1—P_2$ will have caused the valve plunger 22 to move to the position (Fig. 4) which prevents further automatic increase of flow through the VD unit and the feed rate remains constant. In this way there is provided a simple means for regulating the maximum feed pressure available for a given operation and the machine may be operated at a maximum rate without danger of breakage of tool or work.

When tooling conditions require that the feed be in the same direction as the cut (downward cut) the conditions of the pressures are somewhat different than heretofore explained in connection with an upward cut.

If a non-differential motor is used, such as illustrated in Fig. 1, the effective areas of the piston are equal, and hence, the forces required to move the table against a given load in either direction will be the same therefore valve 21 may be symmetrically formed as shown, channels 26 and 27 upon the reverse of the pressure differential functioning as previously described for channels 24 and 23 respectively.

When the work resistance is negative, the rotation of the cutter assists in the movement of the table and causes $P_2$ to become greater than $P_1$. The pressure difference $P_2—P_1$ effects a movement of the piston 34 in the opposite direction which causes a reverse movement of the valve plunger 22. The valve however, is so constructed that the positioning and functioning of the plunger under all conditions is similar to the operations previously described except that it moves in the opposite direction and a detailed description of its various positions is thought unnecessary.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A machine tool combining a work support and a tool support; a multi-speed transmission means for effecting feeding movement between said supports, said transmission means including an hydraulic motor and a variable delivery pump unit provided with a movable volume control device; means normally tending to move said control device to a position thereby to effect a predetermined low rate of feed; and hydraulically actuated means responsive to an increase in motor load to move said volume control device from said low position thereby to increase the rate of feeding movement between said supports and thereafter to decrease the rate of movement when the load on the motor tends to exceed a predetermined value.

2. A machine tool combining a tool support and a work support; a variable speed power transmission for effecting relative movement between said supports; hydraulically actuated means responsive to variations in resistance to support movement normally effective to increase the speed of said transmission in proportion to increases in the resistance; and means rendering said hydraulically actuated means ineffective to produce further increase in transmission speed when the power output of said transmission reaches a given value.

3. A machine tool combining a work support and a tool support; power means for effecting a relative movement between said supports; a control device for said power means; means normally tending to shift said control device to a position effecting a predetermined low rate of relative movement between said supports; means responsive to variations in tooling resistance to vary the action of said control device thereby to effect upon an increase in said resistance an increase in the rate of relative movement between said supports; and means for adjustably controlling the maximum rate of relative movement between the supports.

4. A rate control mechanism for an hydraulic motor combining, a variable delivery unit; fluid conduits to and from said motor; and means automatically to vary the action of said unit thereby to vary the rate of movement of said motor, said means comprising a feed adjusting motor operatively connected to said unit, a control device for said feed adjusting motor, a pressure responsive device actuated by the pressure in the said conduit leading to said motor for moving said control device to a position effecting an increase in the speed of said motor in accordance with an increase in the pressure in the said conduit and means operatively associated with said variable delivery unit for limiting the maximum delivery thereof thereby to limit the rate of movement of said motor to a predetermined value, said last mentioned means being adapted to function irrespective of the value of the pressure in said conduits.

5. A power transmission combining an hydraulic motor; a system of fluid conduits including a motor supply conduit and a motor discharge conduit; a variable flow metering unit in the said discharge conduit adapted to control the rate of discharge from said motor thereby to control the rate of movement of the motor; power means operative to effect variations in the receiving and delivery capacity of said variable unit; means normally adapted to respond to variations in pressure differences in portions of the said system for rendering said power means effective to increase or decrease the rate of flow through said variable unit in accordance with said variations; and means independent of said last mentioned means for limiting the maximum rate of flow through said variable unit irrespective of the value of said variations.

6. A control device for a variable speed power transmission combining hydraulically actuated means for varying the rate of action of the said transmission comprising control means for the hydraulically actuated rate varying means including a control valve and an actuator therefor, said actuator being arranged to respond to an increase in load upon the transmission to actuate said valve first to a position whereby said hydraulic means is operative to increase the speed of the transmission and second to a position whereby said hydraulic means is inoperative to effect further increase in the speed of the transmission; and auxiliary means operative to control the speed range of said transmission irrespective of the load value thereon.

7. A feed controlling device for a machine tool combining a variable speed transmission; a tool support and a work support, one of said supports being adapted to be actuated by said transmission; means automatically operable to vary the speed of said transmission, said means operating to increase the rate of feed as the work resistance increases and including power control means for controlling the power output of said transmission; and means for varying the effective action of said power control means thereby to vary the increment of speed change for unit changes in work resistance.

8. A feed controlling device for a machine tool combining a variable speed transmission; a tool support and a work support, one of said supports being adapted to be actuated by said transmission; means automatically operable to vary the speed of said transmission, said means operating to increase the rate of feed as the work resistance increases and including power control means for controlling the power output of said transmission; means for varying the effective action of said power control means thereby to vary the increment of speed change for unit changes in work resistance; and means limiting the maximum speed of the transmission to a predetermined value irrespective of the value of the work resistance.

9. A feed controlling device for a machine tool combining a variable speed transmission; a tool support and a work support, one of said supports being adapted to be actuated by said transmission; means automatically operable to vary the speed of said transmission, said means operating to increase the rate of speed as the work resistance increases and including power control means for controlling the power output of said transmission; means for varying the effective action of said power control means thereby to vary the increment of speed change for unit changes in work resistance; means limiting the maximum speed of the transmission to a predetermined value irrespective of the value of the work resistance; and means limiting the maximum and minimum speeds of the transmission to predetermined values irrespective of the value of the work resistance.

10. A power transmission combining an hydraulic motor adapted to be subjected to variable loads; rate control means therefor; hydraulically actuated means responsive to a variation from a preselected minimum load upon said motor for increasing the rate of action thereof; means adjustable to control the degree of said variation required to render said hydraulically actuated means effective to produce a unit increase in the rate of action of said motor; and means limiting the maximum rate of motor movement irrespective of the magnitude of said variation.

11. A power transmission having an hydraulic motor adapted to be subjected intermittently to an idle load and working loads of normal but varying magnitudes combining rate control means for the said motor; hydraulically actuated means responsive to unit variations in the normal working load on said motor for actuating said rate control means to a position effecting a predetermined increment of change in rate of motor movement; and means for controlling the distance through which said rate control means is moved for any unit variation in load above said idle load.

12. A feed control for a machine tool having relatively movable supports combining a variable speed transmission for imparting translatory movement to one of said supports; power operated means for controlling the rate of action of said transmission and thereby the rate of said translatory movement; means responsive to load variations on the said transmission in effecting said movement for controlling the operation of said rate varying means, said responsive means operating to effect increases in the rate of said translatory movement as the load on the transmission increases; and means adapted to render said responsive means ineffective to effect further increases in the rate of translatory movement when the load on the said transmission reaches a predetermined value.

HANS ERNST.